United States Patent [19]
Unruh

[11] 3,759,568
[45] Sept. 18, 1973

[54] COVER FOR TRUCK BEDS

[76] Inventor: Cecil Unruh, 8603 Floyd, Overland Park, Kans. 66212

[22] Filed: Sept. 28, 1971

[21] Appl. No.: 184,568

[52] U.S. Cl................ 296/98, 105/377, 160/315, 296/100
[51] Int. Cl............................................. B60j 7/08
[58] Field of Search.......................... 296/98, 100; 105/377; 254/178, 188, 173, 173 R, 173 A, 173 B; 160/235, 265, 266, 268, 310, 315; 242/155, 86.52

[56] References Cited
UNITED STATES PATENTS

| | | | |
|---|---|---|---|
| 1,649,797 | 11/1927 | Winn, Jr. | 160/310 X |
| 2,454,365 | 11/1948 | Woolery | 254/178 X |
| 2,898,147 | 8/1959 | Horner | 296/98 |
| 2,958,083 | 11/1960 | Shook et al. | 160/238 |
| 3,472,548 | 10/1969 | Comisac | 296/98 X |
| 3,086,811 | 4/1963 | Hartviksen | 296/98 |

Primary Examiner—Leo Friaglia
Assistant Examiner—David M. Mitchell
Attorney—John A. Hamilton

[57] ABSTRACT

A cover for truck beds consisting of a flexible cover sheet wound on a reel mounted at the forward end of the truck bed and extendable rearwardly from said reel to cover said truck bed, a reversible power mechanism for turning said reel to selectively pay out or reel in the cover sheet, a tension mechanism operable to apply an increasing tension to said cover sheet as it is paid out from the reel, and a latch mechanism operable to secure the cover sheet in its extended position independently of the tension mechanism.

5 Claims, 7 Drawing Figures

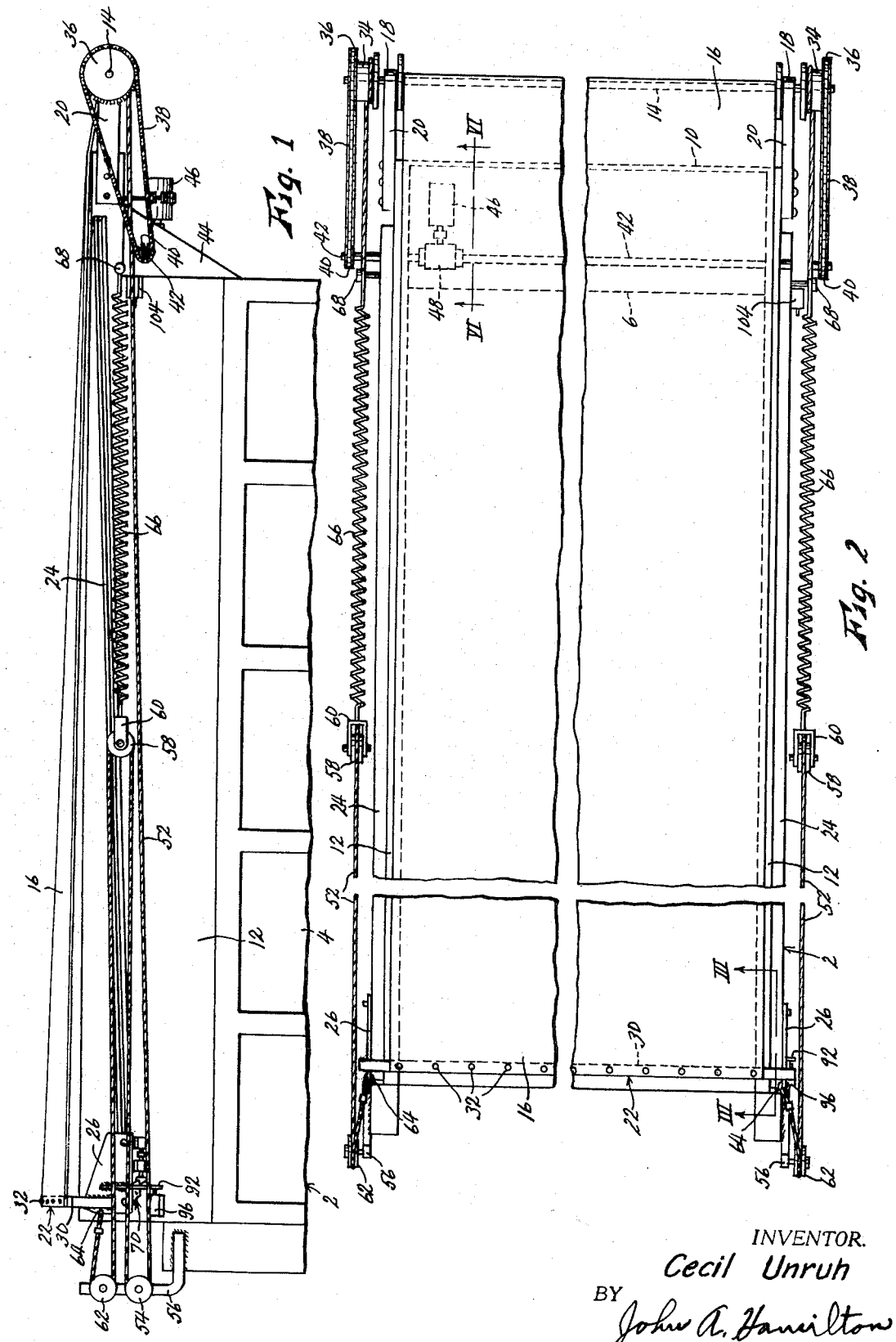

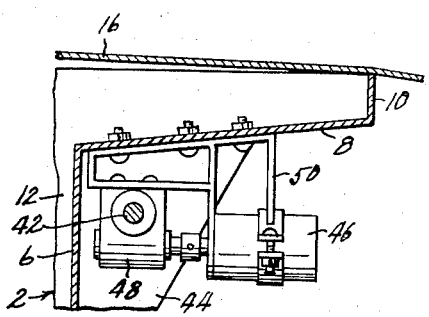
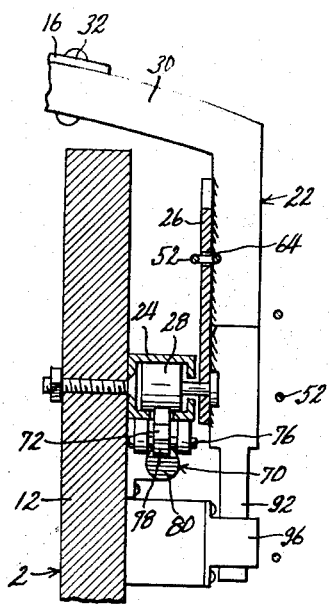
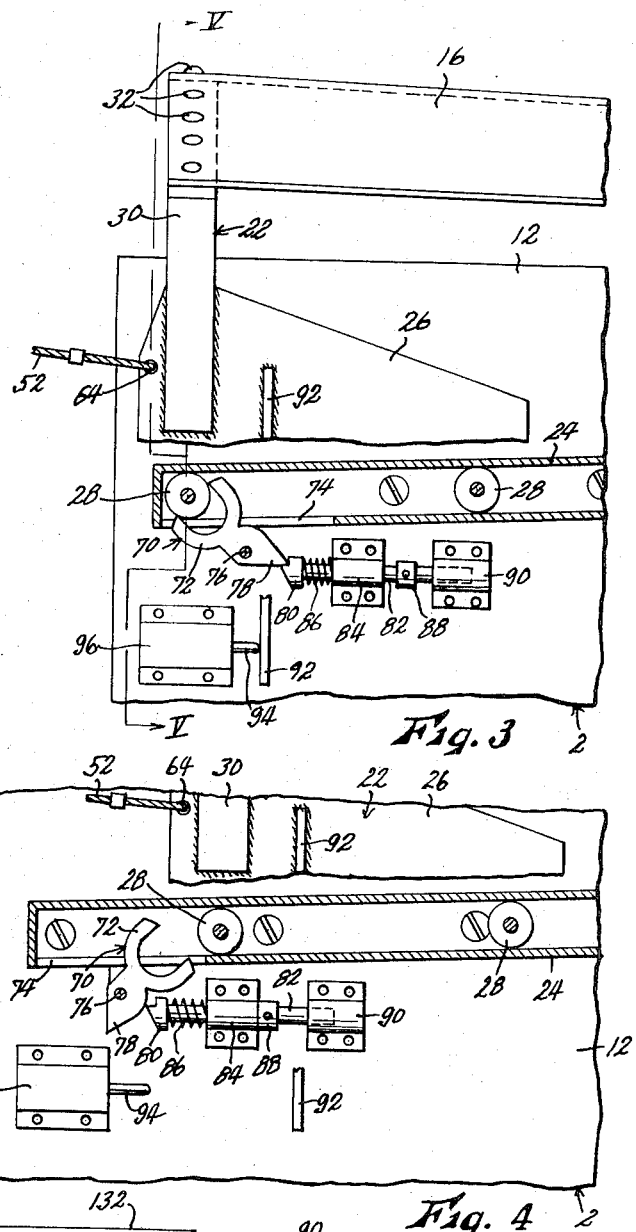
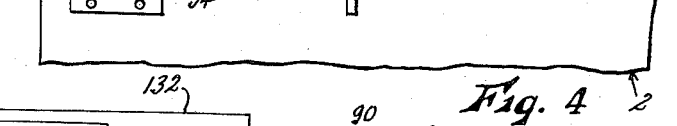
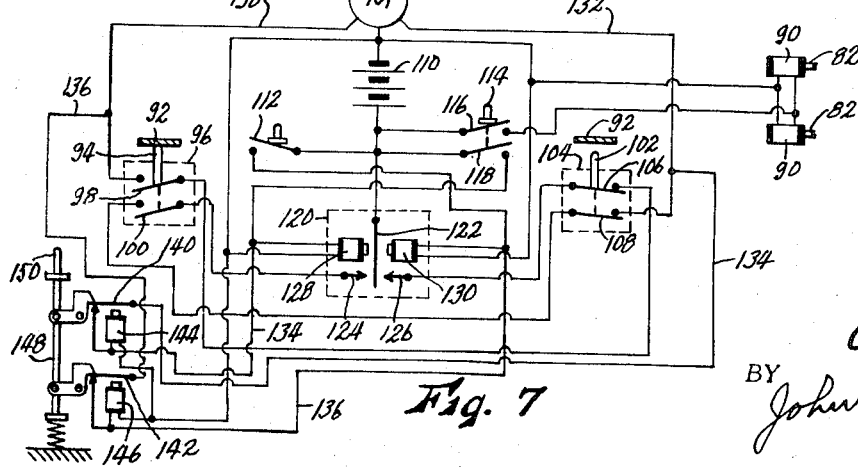

COVER FOR TRUCK BEDS

This invention relates to new and useful improvements in covers for truck beds, and has particular reference to a truck bed cover especially adapted for use in connection with dump trucks and the like when hauling sand, gravel, grain, and other granular or powdered material. Material blowing from uncovered loads of such material, due to the wind created by motion of the truck, is a continuing source of annoyance and even danger to following motorists, sometimes causing damage to automobile finishes, distracting drivers, and getting in their eyes. Many states have already prohibited by law the hauling of such materials in open-bed, uncovered trucks, as a safety provision.

Accordingly, the principal object of the present invention is the provision of a truck bed cover which may be applied easily and conveniently to pre-existing truck beds, and which effectively covers the bed to prevent blowing of the load material therefrom. To this end, the cover consists of a flexible coversheet wound on a reel mounted rotatably at the forward end of the truck bed and extendable rearwardly therefrom to cover the truck bed, and means for turning said drum reel to pay out or reel in said cover sheet.

Another object is the provision of a truck bed cover of the character described having tensioning means operable to apply tension to said cover sheet in an increasing degree as it is paid out from said reel, whereby said cover sheet is maintained smoothly taut and will not flap or "billow" in the wind.

A further object is the provision of a truck bed cover of the character described wherein said tensioning means is resiliently yieldable, and with the addition of latch means operable to lock said cover sheet positively in its fully extended position, whereby said cover sheet is prevented from billowing or flapping as a result of yielding of said tensioning means.

A still further object is the provision of a truck bed cover of the character described which is fully powered and may be operated from any convenient remote station, such as the truck cab.

Other objects are simplicity and economy of construction, and efficiency and dependability of operation.

With these objects in view, as well as other objects which will appear in the course of the specification, reference will be had to the accompanying drawing, wherein:

FIG. 1 is a fragmentary side elevational view of a truck bed, showing a cover embodying the present invention applied operatively thereto, FIG. 2 is a top plan view partially broken away and foreshortened, of the device as shown in FIG. 1, FIG. 3 is an enlarged, fragmentary sectional view taken on line III—III of FIG. 2, with parts left in elevation and partially broken away, and showing the cover latch engaged, FIG. 4 is a view similar to FIG. 3, but showing the cover latch released, FIG. 5 is a fragmentary sectional view taken on line V—V of FIG. 3, with parts left in elevation, FIG. 6 is an enlarged, fragmentary sectional view taken on line VI—VI of FIG. 2, and FIG. 7 is a schematic wiring diagram of the electrical control system.

Like reference numerals apply to similar parts throughout the several views, and the numeral 2 applies generally to a truck bed, the specific construction of which is not pertinent to the present invention except that it be open at the top. As shown, it is a dump truck bed having side walls 4, usually a rear dump gate (not shown), and a front wall 6 (see FIG. 6) extending upwardly above said side walls, then angled forwardly to form a pan 8 which overhangs and protects the truck cab (not shown), said pan having an upright lip 10 at its forward edge. Most commonly, side walls 4 are provided with upward extensions 12 to the full height of the front wall, to increase the capacity of the bed.

A shaft 14 forming a reel for a flexible cover sheet 16 extends horizontally and transversely just forwardly of pan lip 10, being journalled in bearings 18 (see FIG. 2) carried by arms 20 affixed to and extending forwardly from side wall extensions 12 at each side of the truck bed. One end of cover sheet 16 is affixed to shaft 14, and the cover sheet is reeled thereon, but may be unreeled therefrom by rotation of said shaft to extend rearwardly over and completely cover the truck bed. Said cover sheet is of course wide enough to completely bridge the lateral distance between the bed side walls, and may be formed of canvas or any other suitably flexible material, waterproofed if desired.

The rearward end of cover sheet 16 is affixed to a carriage indicated generally by the numeral 22, and carried for forward and rearward movement by a pair of channel iron tracks 24 affixed respectively to the outer surfaces of side wall extensions 12 adjacent the upper edges thereof, and extending substantially the full length of the truck bed. Said tracks are parallel, and are preferably inclined slightly downwardly toward their rearward ends, for a reason which will presently appear. Carriage 22 includes a pair of trucks each consisting of a vertical plate 26 arranged adjacent the associated track 24, a pair of spaced apart rollers 28 carried rotatably by said plate and engaged operatively in the associated track, and a bridge member 30 extending transversely across the truck bed, above the side walls, with its end portions extending downwardly and welded or otherwise rigidly affixed to the respective plates 26. Bridge member 30 may be arched as shown for additional strength, and the rearward edge of cover sheet 16 is affixed thereto as by rivets 32.

Affixed to each extended end of shaft 14 is a cable drum 34, the outer end wall of which constitutes a sprocket wheel 36. Each of said sprocket wheels is operatively connected by means of sprocket chain 38 with a sprocket wheel 40, sprocket wheels 40 being affixed respectively on the opposite ends of a drive shaft 42 extending horizontally and transversely just forwardly of front bed wall 6, and journalled in bearings, not shown, mounted on gusset plates 44 forming portions of the truck bed. Said drive shaft is rotated, selectively in either direction, by a reversible electric motor 46, through a geared speed reducer 48, said motor and speed reducer being mounted beneath pan 8 by bracket 50, as best shown in FIG. 6. It will be understood that speed reducer 48 is of a self-locking type, that is, that the motor cannot be turned by any degree of torque applied to drive shaft 42. For this purpose, the reducer may include a worm driven by motor 46 and engaging a worm gear fixed on the drive shaft.

A flexible steel cable 52 is disposed at each side of the truck bed. One end of each cable is affixed to and wound on the cable drum 34 at that side of the truck bed. As best shown in FIG. 1, each cable extends rearwardly from its drum and is trained around a pulley 54 carried rotatably by a bracket 56 affixed to the extreme rearward end of the truck bed, then forwardly and trained about a free pulley 58 carried rotatably by a clevis 60 intermediate the forward and rearward ends of the truck bed, then rearwardly and trained about a second pulley 62 carried rotatably by bracket 56, and finally forwardly and secured to the associated truck plate 26, as at 64. The rearward end of a helical tension spring 66 is affixed to clevis 60, and the forward end of said spring is attached, as at 68, to the associated side wall extension 12, whereby to maintain the cable under tension. Cables 52 are wound on drums 34 oppositely to the direction of winding of cover sheet 16 on reel 14, so that the cover sheet is wound onto the reel as cable is paid out from the drums, and vice versa. Also, the drums 34 are of a diameter at least slightly larger than the maximum diameter of the cover sheet on reel 14, so that the cable is always reeled in, or paid out, at greater linear rates than the cover sheet is correspondingly paid out or reeled in.

There is also included a latch mechanism indicated generally by the numeral 70, and best shown in FIGS. 3-5, for securing carriage 22 releasably in position with cover sheet 16 fully extended to cover the truck bed. While it could take many forms, as shown it comprises, in connection with each track 24, a U-shaped latch lever 72 which opens upwardly, and extends upwardly into the associated track 24 through a slot 74 formed in the bottom wall of said track. Said lever is pivoted to said track on a horizontal transverse axis beneath the level of rollers 28, as at 76. The lower end of lever 72 forms a latch pawl 78. Thus as carriage 22 approaches the rearward limit of its travel, the rearmost roller 28 of each carriage truck engages in lever 72 and pivots it rearwardly, moving pawl 78 into locking engagement with a notched keeper 80 fixed to the end of a slide bar 82 movable in a bearing member 84 fixed to side wall 12. The slide bar and keeper are biased toward a position to engage the pawl by means of a spring 86 carried on the bar, its movement in this direction being limited by a collar 88 fixed on said bar. Keeper 82 may be retracted against spring 86, whereby to release the pawl, by a solenoid coil 90 also mounted on side wall 12, bar 82 projecting into and forming an armature for the solenoid coil, whenever electric current is supplied to said coil.

Affixed to one of truck plates 26 is a depending switch operating finger 92. When the cover sheet is fully extended to cover the truck bed, said finger engages and depresses the operating plunger 94 of a limit switch 96 also mounted on side wall 12. As diagrammed in FIG. 7, switch 96 includes a pair of normally closed contacts 98 and 100 adapted to be opened by depression of plunger 94. When cover sheet 16 is fully retracted to uncover the truck bed, finger 92 engages and depresses the operating plunger 102 of a second limit switch 104 also mounted on side wall 12, and including a pair of normally closed contacts 106 and 108 adapted to be opened by depression of plunger 102. The control system also includes a source of electric power which may be the truck battery 110, a normally open pushbutton switch 112, a pushbutton switch 114 having a pair of normally open contacts 116 and 118, and a relay 120 having an armature 122 which is normally open, but which is closable selectively on fixed contacts 124 and 126 by energization of relay coils 128 and 130 respectively.

In operation, assuming that the cover sheet has been fully extended to cover the truck bed, and carriage 22 locked in its rearwardmost position by latches 70, as shown in FIGS. 1-3, the operator retracts the cover by momentarily depressing pushbutton 114. The closure of contact 116 completes a circuit to solenoids 90, releasing the latches 70 to free carriage 22 for forward movement, and the closure of contact 118 completes a circuit to relay coil 128 to close said relay on contact 124, but this at first has no effect since contact 100 of switch 96 is then open. Closure of switch contact 118, however, also closes a circuit by-passing contacts 100 and 108, through wires 132 to motor 46, energizing said motor to turn shaft 14 in a clockwise direction, as viewed in FIG. 1, whereby to reel the cover sheet onto said shaft, and to pay out cables 52 from drums 34. As soon as carriage 22 has moved forwardly enough to allow closure of contact 100, and to clear latches 70, pushbutton 114 may be released. Contact 100 then maintains the motor circuit through contact 108 (then closed), and also a holding circuit through wire 134, for relay coil 128, so that retraction of the cover sheet continues. Contacts 98 and 106 of the limit switches, though closed, have no effect at this time since they derive current only from pushbutton 112 or relay contact 126, both of which are open. A suitable mechanical interlock may be provided between pushbuttons 112 and 114, to prevent accidental simultaneous closure of both.

During retraction of the cover, cables 52 are of course paid out from drums 34 more rapidly than the cover sheet 16 is wound on reel shaft 14, due to the larger diameters of drums 34, but the cables and the cover sheet are maintained taut by the resilient recovery of springs 66, so that said cover sheet winds smoothly onto shaft 14. When the cover sheet is fully retracted to uncover the truck bed, finger 92 engages and opens limit switch 104, opening of contact 108 of said switch interrupting both the operative circuit of the motor, and the holding circuit of relay coil 124, so that relay 120 opens and the entire system is at rest.

Similarly, when it is desired to extend the cover sheet, the operator presses pushbutton 112, completing a circuit to coil 130 to close relay 120 on contact 126, and to complete a by-pass circuit through wire 136 by-passing limit switch contact 106 (then open) and limit switch contact 98 (then closed) to motor 46 through wire 138 whereby to cause operation of said motor to turn reel shaft 14 to pay out cover sheet 16, and drums 34 to reel in cables 52. When limit switch 104 closes, pushbutton 112 may be released, the motor circuit being maintained through contacts 106 and 98 (then both closed), and a holding circuit for relay coil 130 being established through wire 136, so that extension of the cover sheet continues until finger 92 opens limit switch 96 to return the system to rest as before. As the cover sheet is extended, more cable is reeled in than cover sheet is paid out, due to the larger diameters of cable drums 34 as compared to reel shaft 14, so that springs 66 are gradually extended to apply a greater and greater tension to the cover sheet. The farther said cover sheet is extended, the greater the tension thereof must be to prevent it from billowing and flapping in the wind, and springs 66 are selected to supply this tension at the properly increasing rate. The downward and rearward slope of tracks 24 provides that the cover sheet, while initially held well above side walls 12 to prevent abrading friction therebetween, is gradually lowered closer and closer to said side walls to provide better wind seal. Actually, while shown as stretched straight, the cover sheet usually sags somewhat to actually engage said side walls.

When the cover sheet is fully extended, carriage 22 is engaged and locked in position by latch mechanisms 70, automatically. These latch mechanisms are desirable since, in their absence, the wind could still get under the cover sheet and cause upward billowing thereof, especially at higher truck speeds, and said billowing could occur since forward movement of carriage 22 could still be permitted by further oscillating yielding of springs 66. Thus, latch mechanisms 70, by positively preventing forward movement of the carriage, eliminate or at least greatly reduce any possible billowing and flapping of the cover sheet.

To permit stoppage of cover sheet 16 at any intermediate position in its movement, for example in an emergency, or when it might be desired to cover only a portion of the truck bed, normally open relays 140 and 142 are inserted respectively in holding circuit wires 134 and 136, as shown in FIG. 7. Said relays are closable by energization of their respective coils 144 and 146, and are latched closed by a latch mechanism 148 common to both. Said latch mechanism may be released to open both of relays 140 and 142 by pressing a single "stop" button 150. Coil 144 is wired to receive current whenever pushbutton 114 is pressed, and coil 146 to receive current whenever pushbutton 112 is pressed. Thus whenever, while cover sheet 16 is being moved in either direction, and is at any position, it may be stopped by pressing button 150. This opens both of relays 140 and 142, of course including the one operative at that time. This interrupts the holding circuit of the coil 128 or 130 of relay 120 which is then operative, allowing relay 120 to open to interrupt the operative motor circuit. The system is then at rest, with cover sheet 16 extended to whatever degree it was when button 150 was presed, and will remain at rest when button 150 is released. Motor 46 may be restarted, to either further extend or further retract the cover sheet, as may be desired, by pressing the appropriate pushbutton 112 or 114 momentarily. This energizes the desired relay coil 144 or 146 to close the associated relay 140 or 142, which is then secured closed by latch mechanism 148. This in turn completes the holding circuit to the desired coil 128 or 130 of relay 120, causing relay 120 to complete the desired motor circuit. All of the contacts of limit switches 96 and 104 are of course closed at this time. At this point, one of relays 140 or 142 is still open, but it will be closed automatically whenever the corresponding pushbutton 112 or 114 is next pressed to initiate movement of the cover sheet in the opposite direction. In normal operation, when it is desired only to cover or uncover the truck bed completely, relays 140 and 142 remain closed at all times.

While I have shown and described a specific embodiment of my invention, it will be readily apparent that many minor changes of structure and operation could be made without departing from the spirit of the invention.

What I claim as new and desire to protect by Letters Patent is:

1. A cover for an open-topped truck bed having side walls, said cover comprising:
   a. a pair of track members affixed to said truck bed side walls adajcent their upper edges and extending substantially the full length thereof,
   b. a carriage carried by said tracks for movement therealong and including a bridge member extending transversely across the top of said truck bed,
   c. a pulley mounted rotatably at the rearward end of said truck bed,
   d. a cover sheet reel mounted rotatably at the forward end of said truck bed on a horizontal transverse axis,
   e. a pliably flexible cover sheet wound on said reel extending rearwardly therefrom, and secured at its rearward edge to said bridge member,
   f. a cable drum affixed coaxially to and rotatable with said cover sheet reel,
   g. a flexible cable wound on said drum oppositely to the winding of said cover sheet on said reel and extending rearwardly from said drum around said pulley, then forwardly and affixed to said carriage,
   h. reversible power means for rotating said reel and drum selectively in either direction, whereby said cover sheet is reeled in and said cable is simultaneously paid out or vice versa, said power means being self-locking in the sense that said reel and drum cannot be turned by any amount of torque applied thereto by tension in said cover sheet or said cable, said cable drum being of larger diameter than the maximum diameter of the cover sheet roll on said reel, whereby said cable is always paid out from or wound onto said drum at a greater linear rate than said cover sheet is respectively wound onto or pair out from said reel, and
   i. tensioning means operable to take up any slack developing in said cable, whereby to maintain tension in said cover sheet.

2. The device as recited in claim 1 wherein said cable tensioning means is operable to apply tension to said cover sheet in a gradually increasing degree as said cover sheet is extended from said reel.

3. The device as recited in claim 1 with the addition of a second pulley carried rotatably at the rearward end of said truck bed, and a movable third pulley disposed intermediate the forward and rearward ends of said truck bed, said cable extending rearwardly from said drum and being trained about said second pulley, then forwardly and trained around said third pulley, then rearwardly and trained around said first-named pulley, then forwardly for attachment to said carriage, and wherein said tensioning means comprises a forwardly and rearwardly extending tension spring secured at its rearward end to said third pulley and at its forward end to said truck bed, whereby said spring applies a gradually increasing tension to said cover sheet as said cover sheet is extended from said reel.

4. The device as recited in claim 1 with the addition of a latch mechanism carried by said tracks and operable to lock said carriage releasably in its rearwardmost position with said cover sheet fully extended to cover said truck bed.

5. The device as recited in claim 4 wherein said latch mechanism is provided with spring engaging means operable automatically as said carriage reaches its rearwardmost position, and manually actuated release means.

* * * * *